US012787036B2

(12) United States Patent
Yang et al.

(10) Patent No.: US 12,787,036 B2
(45) Date of Patent: Nov. 3, 2026

(54) METHOD FOR ASSOCIATING NEIGHBORING CELL AND DEVICE

(71) Applicant: VIVO MOBILE COMMUNICATION CO., LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 513 days.

(21) Appl. No.: 17/880,584

(22) Filed: Aug. 3, 2022

(65) Prior Publication Data

US 2022/0377732 A1 Nov. 24, 2022

Related U.S. Application Data

(63) Continuation of application No. PCT/CN2021/075209, filed on Feb. 4, 2021.

(30) Foreign Application Priority Data

Feb. 12, 2020 (CN) ........................ 202010089386.3

(51) Int. Cl.

| | |
|---|---|
| ***H04W 72/27*** | (2023.01) |
| ***H04L 5/00*** | (2006.01) |
| ***H04W 16/28*** | (2009.01) |
| ***H04W 72/044*** | (2023.01) |

(52) U.S. Cl.

CPC ........... *H04W 72/27* (2023.01); *H04L 5/0051* (2013.01); *H04W 16/28* (2013.01); *H04W 72/044* (2013.01)

(58) Field of Classification Search

CPC ... H04W 72/27; H04W 16/28; H04W 72/044; H04W 72/23; H04W 36/00; H04W 36/0061; H04W 36/00835; H04L 5/0051; H04L 5/0048; H04L 5/0053

See application file for complete search history.

(56) References Cited

U.S. PATENT DOCUMENTS

| | | | | |
|---|---|---|---|---|
| 2018/0227777 | A1* | 8/2018 | Sun | H04L 5/0094 |
| 2020/0045569 | A1* | 2/2020 | Seo | H04L 5/0048 |
| 2020/0045700 | A1* | 2/2020 | Sun | H04L 5/0091 |

(Continued)

FOREIGN PATENT DOCUMENTS

| | | |
|---|---|---|
| CN | 108737050 A | 11/2018 |
| CN | 109561471 A | 4/2019 |

(Continued)

OTHER PUBLICATIONS

International Search Report issued in corresponding International Application No. PCT/CN2021/075209, mailed Apr. 23, 2021, 4 pages.

(Continued)

*Primary Examiner* — Jeong S Park
(74) *Attorney, Agent, or Firm* — IPX PLLC

(57) ABSTRACT

A method for associating a neighboring cell and a device are provided. The method can be performed by a terminal device and includes: receiving first configuration information, where the first configuration information is associated with one or more control resource sets (CORESETs), and a first CORESET of the one or more CORESETs is associated with a neighboring cell of the terminal device.

19 Claims, 2 Drawing Sheets

100

(56) References Cited

U.S. PATENT DOCUMENTS

| | | | | |
|---|---|---|---|---|
| 2020/0112886 | A1* | 4/2020 | John Wilson | H04W 16/28 |
| 2020/0120584 | A1* | 4/2020 | Yi | H04B 7/06968 |
| 2021/0167821 | A1* | 6/2021 | Chen | H04B 7/0404 |
| 2021/0321462 | A1* | 10/2021 | Takahashi | H04B 7/06968 |
| 2021/0385896 | A1* | 12/2021 | Kim | H04W 36/305 |
| 2022/0077969 | A1* | 3/2022 | Kim | H04L 1/1861 |
| 2022/0271890 | A1* | 8/2022 | Grossmann | H04B 7/0617 |

FOREIGN PATENT DOCUMENTS

| | | | | |
|---|---|---|---|---|
| CN | 110192376 | A | 8/2019 | |
| CN | 110391890 | A | 10/2019 | |
| CN | 110392385 | A | 10/2019 | |
| CN | 110445588 | A | 11/2019 | |
| CN | 110637496 | A | 12/2019 | |
| CN | 110691413 | A | 1/2020 | |
| CN | 110754127 | A | 2/2020 | |
| CN | 111543076 | A | 8/2020 | |
| WO | WO-2018171418 | A1 * | 9/2018 | H04W 72/23 |
| WO | 2019200231 | A1 | 10/2019 | |
| WO | 2020068768 | A1 | 4/2020 | |

OTHER PUBLICATIONS

Nokia et al, "Enhancements to enable inter-cell multi-TRP operations", 3GPP TSG RAN WG1 #103-e R1-2008905, Nov. 1, 2020.

First Office Action issued in related Chinese Application No. 202010089386.3, mailed Dec. 1, 2021, 11 pages.

Ericsson, "On Configuration of Control Resource Sets and Search Space", 3GPP TSG RAN1 WG1 Meeting NR#3 R1-1716578, Sep. 2017.

Ericsson, "Bandwidth configuration for initial Bwp", 3GPP TSG-RAN2 Meeting #104, R2-1817816, Nov. 2018.

* cited by examiner

METHOD FOR ASSOCIATING NEIGHBORING CELL AND DEVICE

CROSS-REFERENCE TO RELATED APPLICATIONS

This application is a continuation of International Application No. PCT/CN2021/075209, filed Feb. 4, 2021, which claims priority to Chinese Patent Application No. 202010089386.3, filed Feb. 12, 2020. The entire contents of each of the above-referenced applications are expressly incorporated herein by reference.

TECHNICAL FIELD

Embodiments of this application relate to the field of communications technologies, and in particular to a method for associating a neighboring cell, and a device.

BACKGROUND

Cell handover is performed mostly with the assistance of a terminal device. For example, a network device selects, according to a measurement report reported by the terminal device, a target cell to perform handover.

A process of the cell handover is as follows: 1. a source cell indicates handover and transmits a handover request to the target cell; 2. the target cell performs admission control and provides Radio Resource Control (RRC) configuration, which is sent, as a part of handover approval, to the source cell; 3. the source cell sends an RRC reconfiguration message to the terminal device, including a handover command; and 4. the terminal device connects RRC to the target cell and replies handover completion.

A Control Resource Set (CORESET) in the related art is only associated with the source cell, and cell handover is inflexible.

SUMMARY

Embodiments of this application are intended to provide a method for associating a neighboring cell and a device.

According to a first aspect, a method for associating a neighboring cell is provided, and the method is performed by a terminal device and includes: receiving first configuration information, where the first configuration information is associated with one or more control resource sets (CORESETs), and a first CORESET of the one or more CORESETs is associated with a neighboring cell of the terminal device.

According to a second aspect, a method for associating a neighboring cell is provided, and the method is performed by a network device and includes: sending first configuration information, where the first configuration information is associated with one or more CORESETs, and a first CORESET of the one or more CORESETs is associated with a neighboring cell of the terminal device.

According to a third aspect, a terminal device is provided and includes: a receiving module, configured to receive first configuration information, where the first configuration information is associated with one or more CORESETs, and a first CORESET of the one or more CORESETs is associated with a neighboring cell of the terminal device.

According to a fourth aspect, a network device is provided and includes: a sending module, configured to send first configuration information, where the first configuration information is associated with one or more CORESETs, and a first CORESET of the one or more CORESETs is associated with a neighboring cell of a terminal device.

According to a fifth aspect, a terminal device is provided and includes: a processor, a memory, and a computer program that is stored in the memory and that can be run on the processor, where when the computer program is executed by the processor, the steps of the method for associating a neighboring cell according to the first aspect are implemented.

According to a sixth aspect, a network device is provided and includes: a processor, a memory, and a computer program that is stored in the memory and that can be run on the processor, where when the computer program is executed by the processor, the method for associating a neighboring cell according to the second aspect are implemented.

According to a seventh aspect, a computer-readable storage medium is provided, where the computer-readable storage medium stores a computer program, and when a processor executes the computer program, the method for associating a neighboring cell according to any of the first aspect and the second aspect are implemented.

In the embodiments of this application, the CORESET is associated with the neighboring cell of the terminal device, which helps fast cell handover and Transmission and Reception Point (TRP) handover in a multi-TRP scenario, so that flexibility of cell handover can be improved, and a handover delay can be reduced efficiently.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of this specification indicates at least one of the former item and the latter item.

It should be understood that the technical solutions in the embodiments of this application may be applied to various communication systems, such as a Long Term Evolution (LTE) system, an LTE Frequency Division Duplex (FDD) system, LTE Time Division Duplex (TDD), a Universal Mobile Telecommunication System (UMTS), or a Worldwide Interoperability for Microwave Access (WiMAX) communications system, a 5G system, or a New Radio (NR) system, or a subsequent evolution communication system.

In the embodiments of this application, a terminal device may include but is not limited to a Mobile Station (MS), a mobile terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), a computer having a wireless communication function, or the like; or the terminal device may further be a portable, pocket-sized, handheld, computer built-in, or in-vehicle mobile apparatus.

In the embodiments of this application, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, an evolved NodeB (eNB or eNodeB) in an LTE network is called a NodeB in a 3rd generation (3G) network, or a network device in a subsequent evolution communications system, but the use of the words does not constitute a restriction.

Figure 1:
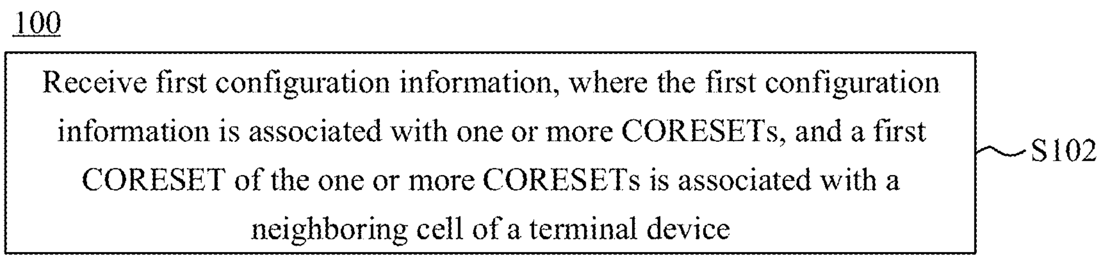
FIG. 1 is a schematic flowchart of a method for associating a neighboring cell according to an embodiment of this application.

As shown in FIG. 1, an embodiment of this application provides a method 100 for associating a neighboring cell, and the method can be performed by a terminal device. In other words, the method can be performed by software or hardware installed in the terminal device. The method 100 includes the following steps.

S102: Receive first configuration information, where the first configuration information is associated with one or more CORESETs.

A first CORESET of the one or more CORESETs is associated with a neighboring cell of the terminal device.

In some embodiments, the first configuration information includes at least one of the following 1) to 12) of the terminal device and/or includes configuration information associated with at least one of the following 1) to 12): that is, the first configuration information includes at least one of the following 1) to 12) of the terminal device; or the first configuration information includes configuration information associated with at least one of the following 1) to 12) of the terminal device; or the first configuration information includes at least one of the following 1) to 12) of the terminal device, and may further include configuration information associated with at least one of the following 1) to 12) of the terminal device:

1) cell-configuration related information;
2) cell group configuration information, namely CellGroupConfig;
3) special cell configuration information, namely SpCellConfig;
4) serving cell configuration information, namely ServingCellConfig;
5) serving cell common configuration information, namely ServingCellConfigCommon;
6) Physical Downlink Control Channel (PDCCH) configuration information, namely PDCCH-Config;
7) Physical Uplink Control Channel (PUCCH) configuration information, namely PUCCH-Config;
8) downlink common configuration information, namely DownlinkConfigCommon;
9) uplink common configuration information, namely UplinkConfigCommon;
10) Bandwidth Part (BWP), namely BWP-Downlink;
11) downlink common BWP, namely BWP-DownlinkCommon; or
12) downlink dedicated BWP, namely BWP-DownlinkDedicated.

In some embodiments, the first CORESET includes at least one of the following: CORESET #0; a CORESET with the smallest number; a CORESET with the largest number; a CORESET agreed in a protocol; a CORESET configured by the network device; or a CORESET reported by the terminal device.

For example, in this embodiment, the first configuration information includes the cell-configuration related information of the terminal device, the cell group configuration information, the special cell configuration information, and the like; and further includes configuration information associated with the cell-configuration related information, the configuration information associated with the downlink dedicated BWP, and the like.

In some embodiments, the first CORESET being associated with the neighboring cell of the terminal device mentioned in this embodiment includes the following situation: related configuration information of the first CORESET indicates at least one of the following: 1) an identifier of a target network node, such as an identifier of the neighboring cell; or 2) information related to an identifier of a target network node, where the target network node includes the neighboring cell.

A network node mentioned in the embodiments of this specification may be a cell or a Transmission and Reception Point (TRP).

For example, through the related configuration information of the first CORESET in this embodiment, the following is configured/activated/updated: a Physical Cell Identifier (PCI) of the neighboring cell or PCI related information, or a cell ID or cell ID-related information, or a TRP ID or TRP ID-related information of another TRP.

Identifier-related information of the target network node mentioned in this embodiment includes scrambling information used to scramble a signal or channel. For example, the scrambling information is related to an identifier of the network node. When the scrambling information is changed, the terminal device knows that a new cell is associated, and can further obtain information such as an identifier of the new cell through the scrambling information.

In some embodiments, the scrambling information is a PDCCH-Demodulation Reference Signal (DMRS)-scrambling identifier, that is, pdcch-DMRS-ScramblingID.

In some embodiments, the related configuration information of the first CORESET includes at least one of the following and/or configuration information associated with at least one of the following: PDCCH configuration information, that is, PDCCH-Config; or control resource set (ControlResourceSet) information.

For example, the related configuration information of the first CORESET includes the PDCCH-Config and the ControlResourceSet information. For another example, the related configuration information of the first CORESET includes configuration information associated with the PDCCH-Config and configuration information associated with the ControlResourceSet information. For still another example, the related configuration information of the first CORESET includes the PDCCH-Config, the ControlResourceSet information, configuration information associated with the PDCCH-Config, and configuration information associated with the ControlResourceSet information.

In some embodiments, the first CORESET being associated with the neighboring cell of the terminal device mentioned in this embodiment includes the following two situations: 1) a first RS is an RS of the neighboring cell, or 2) configuration information of the first RS is associated with the neighboring cell.

The first RS includes an RS in Transmission Configuration Indication (TCI) or Quasi Co-Location (QCL) information of the first CORESET.

The RS in the TCI of the first CORESET mentioned in this embodiment may be an RS in the QCL information included in the TCI of the first CORESET.

Configuration information of the first RS mentioned in this embodiment is associated with the neighboring cell. For example, through the configuration information of the first RS, the following is configured/activated/updated: PCI or PCI-related information of the neighboring cell, a cell ID or cell ID-related information, or a TRP ID or TRP ID-related information of another TRP.

In this embodiment of this application, the first CORESET is associated with the neighboring cell of the terminal device, so that the terminal device can directly use the first CORESET when performing cell handover, so that a time delay for cell handover can be reduced.

In the method for associating a neighboring cell according to this embodiment of this application, the CORESET is associated with the neighboring cell of the terminal device, which helps fast cell handover and TRP handover in a multi-TRP scenario, so that flexibility for cell handover can be improved, and a handover delay can be reduced efficiently.

In Embodiment 100, the first CORESET is associated with a neighboring cell, and when the terminal device performs cell handover, in some embodiments, related configuration information of a channel or signal associated with first configuration information of the terminal device is updated (or changed, altered, or the like).

In another embodiment, the related configuration information of the channel or signal associated with the first configuration information is unchanged. In an example, the related configuration information does not include the first CORESET. In still another example, the related configuration information includes the first CORESET, that is, although the first CORESET is associated with the neighboring cell, the related configuration information may be unchanged.

In some embodiments, the channel or signal associated with the first configuration information includes at least one of the following: a PDCCH, a Physical Downlink Shared Channel (PDSCH), a PUCCH, a Physical Uplink Shared Channel (PUSCH), a Sounding Reference Signal (SRS), a Channel State Information Reference Signal (CSI-RS), an SS/PBCH Block (SSB), or a Physical Random Access Channel (PRACH).

In some embodiments, the channel associated with the first configuration information includes a PDCCH, and the PDCCH is indicated by a second CORESET. The second CORESET includes at least one of the following 1) to 4):

1) a CORESET except for the first CORESET of a plurality of CORESETs associated with the first configuration information;
2) a CORESET except for the first CORESET of a plurality of CORESETs corresponding to the first TRP identifier, where the first TRP identifier includes a TRP identifier corresponding to the first CORESET;
3) a CORESET except for the first CORESET of all CORESETs of the terminal device; or
4) a CORESET except for the first CORESET in a CORESET list configured by a network device.

In some embodiments, the channel or signal associated with the first configuration information includes a first channel or a first signal and a second channel or a second signal. The first channel or the first signal is directly associated with the first configuration information, and the second channel or the second signal is associated with the first channel or the first signal, that is, the second channel or the second signal is indirectly associated with the first configuration information.

For example, the first channel associated with the first configuration information (and also associated with a CORESET) is the PDCCH, and the PDCCH schedules/is associated with the second channel or the second signal—PDSCH, PUSCH, PUCCH, SRS, PRACH, or the like. Therefore, these second channels or second signals are also associated with the first configuration information.

In some embodiments, the "update" of the related configuration information of the channel or signal associated with the first configuration information mentioned in the foregoing embodiment includes at least one of the following 1) to 11):

1) first TCI follows the first CORESET;
2) first QCL follows the first CORESET;
3) first spatial relation information follows the first CORESET;
4) first TCI is associated with a first RS of the neighboring cell;
5) first QCL is associated with a first RS of the neighboring cell;
6) first spatial relation information is associated with a first RS of the neighboring cell;
7) a second TRP identifier follows the first CORESET;
8) first scrambling information follows the first CORESET;
9) a first Radio Network Temporary Identifier (RNTI) follows the first CORESET;
10) a first path loss reference RS (PathLossreference RS, PL RS) follows a second RS in the TCI or QCL of the first CORESET;
11) a first path loss reference RS follows a first RS of the neighboring cell.

The first TCI, the first QCL, the first spatial relation information, the second TRP identifier, the first scrambling information, the first RNTI, and the first path loss reference RS belong to the channel or signal associated with the first configuration information.

The first TCI being associated the first RS of the neighboring cell; the first QCL being associated with the first RS of the neighboring cell; and the first spatial relation information being associated with the first RS of the neighboring cell respectively mentioned in 4), 5), and 6) in the foregoing embodiments will be described in detail below.

In some embodiments, the RS in the first TCI, the RS in the first QCL, the RS in the first spatial relation information, and the first path loss reference RS are a first RS of the neighboring cell indicated by at least one of the following:

Radio Resource Management (RRM); Radio Link Management (RLM); beam reporting; or beam management.

In some embodiments, the first RS is at least one of the following: SSB; CSI-RS; or SRS.

In some embodiments, in a case that the neighboring cell has a plurality of reported and/or measured RSs, the first RS satisfies at least one of the following: the best signal quality; the smallest number; the largest number; SSB preferred; CSI-RS preferred; SRS preferred; autonomously selected by the terminal device; or indicated by a network device.

Signal quality mentioned in the embodiments of this specification may be at least one of the following: Signal to Interference plus Noise Ratio (SINR); Reference Signal Receiving Power (RSRP); or Reference Signal Receiving Quality (RSRQ).

The second TRP identifier following the first CORESET mentioned in 7) of the previous embodiment will be described in detail below.

In some embodiments, the second TRP identifier includes: a TRP identifier associated with a CORESET associated with the channel or signal associated with the first configuration information.

In some embodiments, a TRP identifier associated with a target channel or a target signal is changed. The target channel or target signal includes a channel or signal associated with the second TRP identifier and/or a channel or signal associated with a CORESET associated with the second TRP identifier. In some embodiments, the second TRP belongs to the neighboring cell.

In some embodiments, configuration information except the second TRP identifier is unchanged, and the configuration information except the second TRP identifier includes at least one of the following: a time domain resource; a frequency domain resource; a period; scrambling; TCI; QCL; or spatial relation information.

The first scrambling information following the first CORESET mentioned in 8) of the foregoing embodiment will be described in detail below.

In some embodiments, for the PDCCH, the scrambling information is a physical downlink control channel-demodulation reference signal-scrambling identifier, that is, pdcch-DMRS-ScramblingID.

In some embodiments, for a CSI-RS/NZP-CSI-RS, the scrambling information is a scrambling identifier, that is, ScramblingId.

In some embodiments, for the PDSCH, the scrambling information is a data scrambling identifier-physical downlink shared channel, that is, dataScramblingIdentityPDSCH.

In some embodiments, for the PUCCH, the scrambling information is a frequency hopping identifier, that is, hoppingId.

In some embodiments, for the PUSCH, the scrambling information is a data scrambling identifier-physical uplink shared channel, that is, dataScramblingIdentityPUSCH.

The first RNTI following the first CORESET mentioned in 9) of the foregoing embodiment will be described in detail below.

In some embodiments, the first RNTI includes at least one of the following: a cell-radio network temporary identifier (C-RNTI); a modulation and coding scheme-radio network temporary identifier (mcs-C-RNTI); a configured scheduling-radio network temporary identifier (CS-RNTI); a system information-radio network temporary identifier (SI-RNTI); a paging-radio network temporary identifier (P-RNTI); a random access-radio network temporary identifier (RA-RNTI); or a temporary cell-radio network temporary identifier (TC-RNTI).

The first PL RS following the second RS in the TCI or QCL of the first CORESET mentioned in 10) of the previous embodiment will be described in detail below.

In some embodiments, the first PL RS includes a path loss reference RS corresponding to at least one of the following: the PUCCH, the PUSCH, the SRS, or the PRACH.

In some embodiments, the first PL RS may be a path loss calculation reference RS, a path loss reference RS, or a path loss RS.

The method for associating a neighboring cell according to an embodiment of this application has been described in detail above with reference to FIG. 1. A method for associating a neighboring cell according to another embodiment of this application will be described in detail below with reference to FIG. 2. It can be understood that interaction between a network device and a terminal device described on the network device side is the same as that described on the terminal device side in the method shown in FIG. 1. To avoid repetition, relevant descriptions are appropriately omitted.

Figure 2:
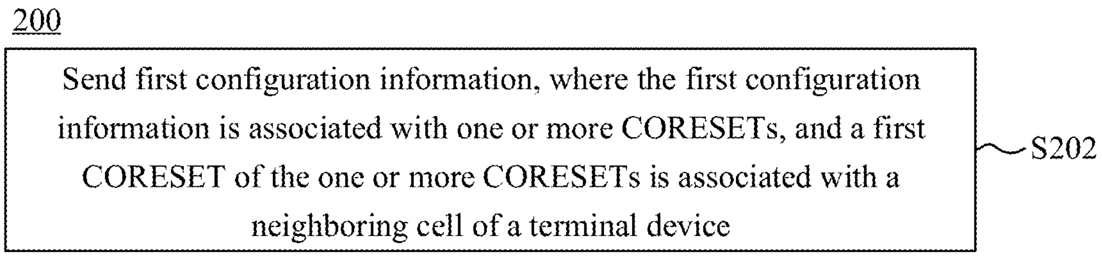
FIG. 2 is a schematic flowchart of a method for associating a neighboring cell according to another embodiment of this application.

FIG. 2 is a schematic flowchart for implementing a method for associating a neighboring cell according to an embodiment of this application, which can be applied to the network device side. As shown in FIG. 2, the method 200 includes the following step.

S202: Send first configuration information, where the first configuration information is associated with one or more CORESETs, and a first CORESET of the one or more CORESETs is associated with a neighboring cell of the terminal device.

In the method for associating a neighboring cell according to this embodiment of this application, the CORESET is associated with the neighboring cell of the terminal device, which helps fast cell handover and TRP handover in a multi-TRP scenario, so that flexibility for cell handover can be improved, and a handover delay can be reduced efficiently.

As an embodiment, the first configuration information includes at least one of the following 1) to 12) of the terminal device and/or configuration information associated with at least one of the following 1) to 12):

1) cell-configuration related information;
2) cell group configuration information;
3) special cell configuration information;
4) serving cell configuration information;
5) serving cell common configuration information;
6) PDCCH configuration information;
7) PUCCH configuration information;
8) downlink common configuration information;
9) uplink common configuration information;
10) downlink BWP;
11) downlink common BWP; or
12) downlink dedicated BWP.

As an embodiment, the first CORESET includes at least one of the following: CORESET #0; a CORESET with the smallest number; a CORESET with the largest number; a CORESET agreed in a protocol; a CORESET configured by the network device; or a CORESET reported by the terminal device.

As an embodiment, related configuration information of the first CORESET indicates at least one of the following: an identifier of a target network node; or identifier-related information of a target network node, where the target network node includes the neighboring cell.

As an embodiment, a first reference signal RS is an RS of the neighboring cell, or configuration information of the first RS is associated with the neighboring cell. The first RS includes an RS in transmission configuration indication TCI or quasi-co-location QCL information of the first CORESET.

As an embodiment, the identifier-related information includes scrambling information used to scramble a signal or channel.

As an embodiment, the related configuration information of the first CORESET includes at least one of the following and/or configuration information associated with at least one of the following: PDCCH configuration information; or ControlResourceSet information.

As an embodiment, related configuration information of a channel or signal associated with the first configuration information is updated.

As an embodiment, the channel or signal associated with the first configuration information includes at least one of the following: a PDCCH, a PDSCH, a PUCCH, a PUSCH, an SRS, a CSI-RS, an SSB, or a PRACH.

As an embodiment, the channel or signal associated with the first configuration information includes a PDCCH, and the PDCCH is indicated by a second CORESET. The second CORESET includes at least one of the following 1) to 4):

1) a CORESET except for the first CORESET of a plurality of CORESETs;
2) a CORESET except for the first CORESET of a plurality of CORESETs corresponding to a first TRP identifier, where the first TRP identifier includes a TRP identifier corresponding to the first CORESET;
3) a CORESET except for the first CORESET of CORESETs of the terminal device;
4) a CORESET except for the first CORESET in a CORESET list configured by a network device.

As an embodiment, the channel or signal associated with the first configuration information includes a first channel or a first signal and a second channel or a second signal. The first channel or the first signal is directly associated with the first configuration information, and the second channel or the second signal is associated with the first channel or the first signal.

As an embodiment, related configuration information of the channel or signal associated with the first configuration information is unchanged.

As an embodiment, update of related configuration information of the channel or signal associated with the first configuration information includes at least one of the following 1) to 11):

1) first TCI follows the first CORESET;
2) first QCL follows the first CORESET;
3) first spatial relation information follows the first CORESET;
4) first TCI is associated with a first RS of the neighboring cell;
5) first QCL is associated with a first RS of the neighboring cell;
6) first spatial relation information is associated with a first RS of the neighboring cell;
7) a second TRP identifier follows the first CORESET;
8) first scrambling information follows the first CORESET;
9) a first RNTI follows the first CORESET;
10) a first path loss reference RS follows a second RS in the TCI or QCL of the first CORESET; or
11) a first path loss reference RS follows a first RS of the neighboring cell.

The first TCI, the first QCL, the first spatial relation information, the second TRP identifier, the first scrambling information, the first RNTI, and the first path loss reference RS belong to the channel or signal associated with the first configuration information.

As an embodiment, the RS in the first TCI, the RS in the first QCL, the RS in the first spatial relation information, and the first path loss reference RS are a first RS of the neighboring cell indicated by at least one of the following: RRM; RLM; beam reporting; or beam management.

As an embodiment, the first RS is at least one of the following: SSB; CSI-RS; or SRS.

As an embodiment, in a case that the neighboring cell has a plurality of reported and/or measured RSs, the first RS satisfies at least one of the following: the best signal quality; the smallest number; the largest number; SSB preferred; CSI-RS preferred; SRS preferred; autonomously selected by the terminal device; or indicated by a network device.

As an embodiment, the second TRP identifier includes: a TRP identifier associated with a CORESET associated with the channel or signal associated with the first configuration information.

As an embodiment, a TRP identifier associated with a target channel or a target signal is changed. The target channel or target signal includes a channel or signal associated with the second TRP identifier and/or a channel or signal associated with a CORESET associated with the second TRP identifier.

As an embodiment, configuration information except the second TRP identifier is unchanged, and the configuration information except the second TRP identifier includes at least one of the following: a time domain resource; a frequency domain resource; a period; scrambling; TCI; QCL; or spatial relation information.

As an embodiment, the first RNTI includes at least one of the following: C-RNTI; mcs-C-RNTI; CS-RNTI; SI-RNTI; P-RNTI; RA-RNTI; or TC-RNTI.

As an embodiment, the first scrambling information includes at least one of the following: pdcch-DMRS-ScramblingID; ScramblingId; dataScramblingIdentityPDSCH; hoppingId; or dataScramblingIdentityPUSCH.

As an embodiment, the first path loss reference RS includes a path loss reference RS corresponding to at least one of the following: the PUCCH, the PUSCH, the SRS, or the PRACH.

The method for associating a neighboring cell according to an embodiment of this application has been described in detail above with reference to FIG. 1 and FIG. 2. A terminal device according to an embodiment of this application will be described in detail below with reference to FIG. 3.

Figure 3:
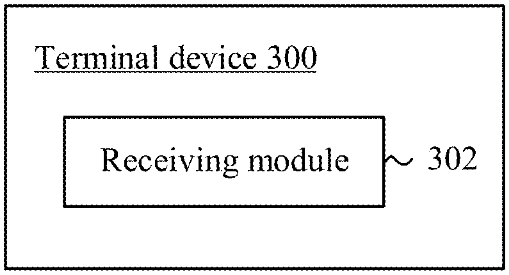
FIG. 3 is a schematic structural diagram of a terminal device according to an embodiment of this application.

FIG. 3 is a schematic structural diagram of a terminal device according to an embodiment of this application. As shown in FIG. 3, a terminal device 300 includes a receiving module 302, which can be configured to receive first configuration information, where the first configuration information is associated with one or more CORESETs, and a first CORESET of the one or more CORESETs is associated with a neighboring cell of the terminal device.

In this embodiment of this application, the CORESET is associated with the neighboring cell of the terminal device, which helps fast cell handover and TRP handover in a multi-TRP scenario, so that flexibility of cell handover can be improved, and a handover delay can be reduced efficiently.

As an embodiment, the first configuration information includes at least one of the following 1) to 12) of the terminal device and/or configuration information associated with at least one of the following:

1) cell-configuration related information;
2) cell group configuration information;
3) special cell configuration information;
4) serving cell configuration information;
5) serving cell common configuration information;
6) PDCCH configuration information;
7) PUCCH configuration information;
8) downlink common configuration information;
9) uplink common configuration information;
10) downlink bandwidth part BWP;
11) downlink common BWP; or
12) downlink dedicated BWP.

As an embodiment, the first CORESET includes at least one of the following: CORESET #0; a CORESET with the smallest number; a CORESET with the largest number; a CORESET agreed in a protocol; a CORESET configured by the network device; or a CORESET reported by the terminal device.

As an embodiment, related configuration information of the first CORESET indicates at least one of the following: an identifier of a target network node; or an identifier-related information of a target network node. The target network node includes the neighboring cell.

As an embodiment, a first reference signal RS is an RS of the neighboring cell, or configuration information of the first RS is associated with the neighboring cell. The first RS includes an RS in transmission configuration indication TCI or quasi-co-location QCL information of the first CORESET.

As an embodiment, the identifier-related information includes scrambling information used to scramble a signal or channel.

As an embodiment, the related configuration information of the first CORESET includes at least one of the following and/or configuration information associated with at least one of the following: PDCCH configuration information; or ControlResourceSet information.

As an embodiment, related configuration information of a channel or signal associated with the first configuration information is updated.

As an embodiment, the channel or signal associated with the first configuration information includes at least one of the following: a PDCCH, a PDSCH, a PUCCH, a PUSCH, an SRS, a CSI-RS, an SSB, or a PRACH.

As an embodiment, the channel or signal associated with the first configuration information includes a PDCCH, and the PDCCH is indicated by a second CORESET. The second CORESET includes at least one of the following 1) to 4):

1) a CORESET except the first CORESET of a plurality of CORESETs;
2) a CORESET except the first CORESET of a plurality of CORESETs corresponding to a first TRP identifier, where the first TRP identifier includes a TRP identifier corresponding to the first CORESET;
3) a CORESET except the first CORESET of CORESETs of the terminal device;
4) a CORESET except the first CORESET in a CORESET list configured by a network device.

As an embodiment, the channel or signal associated with the first configuration information includes a first channel or a first signal and a second channel or a second signal. The first channel or the first signal is directly associated with the first configuration information, and the second channel or the second signal is associated with the first channel or the first signal.

As an embodiment, related configuration information of the channel or signal associated with the first configuration information is unchanged.

As an embodiment, update of related configuration information of the channel or signal associated with the first configuration information includes at least one of the following 1) to 11):

1) first TCI follows the first CORESET;
2) first QCL follows the first CORESET;
3) first spatial relation information follows the first CORESET;
4) first TCI is associated with a first RS of the neighboring cell;
5) first QCL is associated with a first RS of the neighboring cell;
6) first spatial relation information is associated with a first RS of the neighboring cell;
7) a second TRP identifier follows the first CORESET;
8) first scrambling information follows the first CORESET;
9) a first RNTI follows the first CORESET;
10) a first path loss reference RS follows a second RS in the TCI or QCL of the first CORESET; or
11) a first path loss reference RS follows a first RS of the neighboring cell.

The first TCI, the first QCL, the first spatial relation information, the second TRP identifier, the first scrambling information, the first RNTI, and the first path loss reference RS belong to the channel or signal associated with the first configuration information.

As an embodiment, the RS in the first TCI, the RS in the first QCL, the RS in the first spatial relation information, and the first path loss reference RS are a first RS of the neighboring cell indicated by at least one of the following: RRM; RLM; beam reporting; or beam management.

As an embodiment, the first RS is at least one of the following: SSB; CSI-RS; or SRS.

As an embodiment, in a case that the neighboring cell has a plurality of reported and/or measured RSs, the first RS satisfies at least one of the following: the best signal quality; the smallest number; the largest number; SSB preferred; CSI-RS preferred; SRS preferred; autonomously selected by the terminal device; or indicated by a network device.

As an embodiment, the second TRP identifier includes: a TRP identifier associated with a CORESET associated with the channel or signal associated with the first configuration information.

As an embodiment, a TRP identifier associated with a target channel or a target signal is changed. The target channel or target signal includes a channel or signal associated with the second TRP identifier and/or a channel or signal associated with a CORESET associated with the second TRP identifier.

As an embodiment, configuration information except the second TRP identifier is unchanged, and the configuration information except the second TRP identifier includes at least one of the following: a time domain resource; a frequency domain resource; a period; scrambling; TCI; QCL; or spatial relation information.

As an embodiment, the first RNTI includes at least one of the following: C-RNTI; mcs-C-RNTI; CS-RNTI; SI-RNTI; P-RNTI; RA-RNTI; or TC-RNTI.

As an embodiment, the first scrambling information includes at least one of the following: pdcch-DMRS-ScramblingID; ScramblingId; dataScramblingIdentityPDSCH; hoppingId; or dataScramblingIdentityPUSCH.

As an embodiment, the first path loss reference RS includes a path loss reference RS corresponding to at least one of the following: the PUCCH, the PUSCH, the SRS, or the PRACH.

For the terminal device 300 according to the embodiment of this application, please refer to the flow corresponding to the method 100 according to the embodiment of this application. Furthermore, each unit/module of the terminal device 300 and the foregoing other operations and/or functions are used to implement the corresponding flow of the method 100, can achieve the same or equivalent technical effect, and will no longer be described herein for the purpose of brevity.

Figure 4:
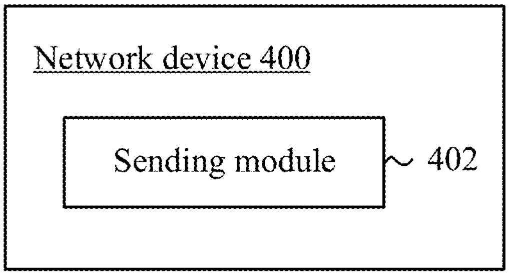
FIG. 4 is a schematic structural diagram of a network device according to an embodiment of this application.

FIG. 4 is a schematic structural diagram of a network device according to an embodiment of this application. As shown in FIG. 4, a network device 400 includes: a sending module 402, which can be configured to send first configuration information, where the first configuration information is associated with one or more CORESETs, and a first CORESET of the one or more CORESETs is associated with a neighboring cell of a terminal device.

In this embodiment of this application, the CORESET is associated with the neighboring cell of the terminal device, which helps fast cell handover and TRP handover in a multi-TRP scenario, so that flexibility of cell handover can be improved, and a handover delay can be reduced efficiently.

As an embodiment, the first configuration information includes at least one of the following 1) to 12) of the terminal device and/or configuration information associated with at least one of the following 1) to 12):

1) cell-configuration related information;
2) cell group configuration information;
3) special cell configuration information;
4) serving cell configuration information;
5) serving cell common configuration information;
6) PDCCH configuration information;
7) PUCCH configuration information;
8) downlink common configuration information;
9) uplink common configuration information;
10) downlink bandwidth part BWP;
11) downlink common BWP; or
12) downlink dedicated BWP.

As an embodiment, the first CORESET includes at least one of the following: CORESET #0; a CORESET with the smallest number; a CORESET with the largest number; a CORESET agreed in a protocol; a CORESET configured by the network device; or a CORESET reported by the terminal device.

As an embodiment, related configuration information of the first CORESET indicates at least one of the following: an identifier of a target network node; or identifier-related information of a target network node, where the target network node includes the neighboring cell.

As an embodiment, a first reference signal RS is an RS of the neighboring cell, or configuration information of the first RS is associated with the neighboring cell. The first RS includes an RS in transmission configuration indication TCI or quasi-co-location QCL information of the first CORESET.

As an embodiment, the identifier-related information includes scrambling information used to scramble a signal or channel.

As an embodiment, the related configuration information of the first CORESET includes at least one of the following and/or configuration information associated with at least one of the following: PDCCH configuration information; or ControlResourceSet information.

As an embodiment, related configuration information of a channel or signal associated with the first configuration information is updated.

As an embodiment, the channel or signal associated with the first configuration information includes at least one of the following: a PDCCH, a PDSCH, a PUCCH, a PUSCH, an SRS, a CSI-RS, an SSB, or a PRACH.

As an embodiment, the channel or signal associated with the first configuration information includes a PDCCH, and the PDCCH is indicated by a second CORESET. The second CORESET includes at least one of the following 1) to 4):

1) a CORESET except for the first CORESET of a plurality of CORESETs;
2) a CORESET except for the first CORESET of a plurality of CORESETs corresponding to a first TRP identifier, where the first TRP identifier includes a TRP identifier corresponding to the first CORESET;
3) a CORESET except for the first CORESET of CORESETs of the terminal device;
4) a CORESET except for the first CORESET in a CORESET list configured by a network device.

As an embodiment, the channel or signal associated with the first configuration information includes a first channel or a first signal and a second channel or a second signal. The first channel or the first signal is directly associated with the first configuration information, and the second channel or the second signal is associated with the first channel or the first signal.

As an embodiment, related configuration information of the channel or signal associated with the first configuration information is unchanged.

As an embodiment, update of related configuration information of the channel or signal associated with the first configuration information includes at least one of the following 1) to 11):

1) first TCI follows the first CORESET;
2) first QCL follows the first CORESET;
3) first spatial relation information follows the first CORESET;
4) first TCI is associated with a first RS of the neighboring cell;
5) first QCL is associated with a first RS of the neighboring cell;
6) first spatial relation information is associated with a first RS of the neighboring cell;
7) a second TRP identifier follows the first CORESET;
8) first scrambling information follows the first CORESET;
9) a first RNTI follows the first CORESET;
10) a first path loss reference RS follows a second RS in the TCI or QCL of the first CORESET; or
11) a first path loss reference RS follows a first RS of the neighboring cell.

The first TCI, the first QCL, the first spatial relation information, the second TRP identifier, the first scrambling information, the first RNTI, and the first path loss reference RS belong to the channel or signal associated with the first configuration information.

As an embodiment, the RS in the first TCI, the RS in the first QCL, the RS in the first spatial relation information, and the first path loss reference RS are a first RS of the neighboring cell indicated by at least one of the following: RRM; RLM; beam reporting; or beam management.

As an embodiment, the first RS is at least one of the following: SSB; CSI-RS; or SRS.

As an embodiment, in a case that the neighboring cell has a plurality of reported and/or measured RSs, the first RS satisfies at least one of the following: the best signal quality; the smallest number; the largest number; SSB preferred; CSI-RS preferred; SRS preferred; autonomously selected by the terminal device; or indicated by a network device.

As an embodiment, the second TRP identifier includes: a TRP identifier associated with a CORESET associated with the channel or signal associated with the first configuration information.

As an embodiment, a TRP identifier associated with a target channel or a target signal is changed. The target channel or target signal includes a channel or signal associated with the second TRP identifier and/or a channel or signal associated with a CORESET associated with the second TRP identifier.

As an embodiment, configuration information except the second TRP identifier is unchanged, and the configuration information except the second TRP identifier includes at least one of the following: a time domain resource; a frequency domain resource; a period; scrambling; TCI; QCL; or spatial relation information.

As an embodiment, the first RNTI includes at least one of the following: C-RNTI; mcs-C-RNTI; CS-RNTI; SI-RNTI; P-RNTI; RA-RNTI; or TC-RNTI.

As an embodiment, the first scrambling information includes at least one of the following: pdcch-DMRS-ScramblingID; ScramblingId; dataScramblingIdentityPDSCH; hoppingId; or dataScramblingIdentityPUSCH.

As an embodiment, the first path loss reference RS includes a path loss reference RS corresponding to at least one of the following: the PUCCH, the PUSCH, the SRS, or the PRACH.

For the network device 400 according to the embodiment of this application, please refer to the flow corresponding to the method 200 according to the embodiment of this application. Furthermore, each unit/module of the network device 400 and the foregoing other operations and/or functions are used to implement the corresponding flow of the method 200, the same or equivalent technical effect can be achieved, and will no longer be described herein for the purpose of brevity.

The embodiments in this specification are described in a progressive manner. Each embodiment usually focuses on a difference from another embodiment. For a same or similar part of the embodiments, please refer to each other. A device embodiment is described simply because the device embodiment is similar to the method embodiment. For related details, please refer to some description of the method embodiment.

Figure 5:
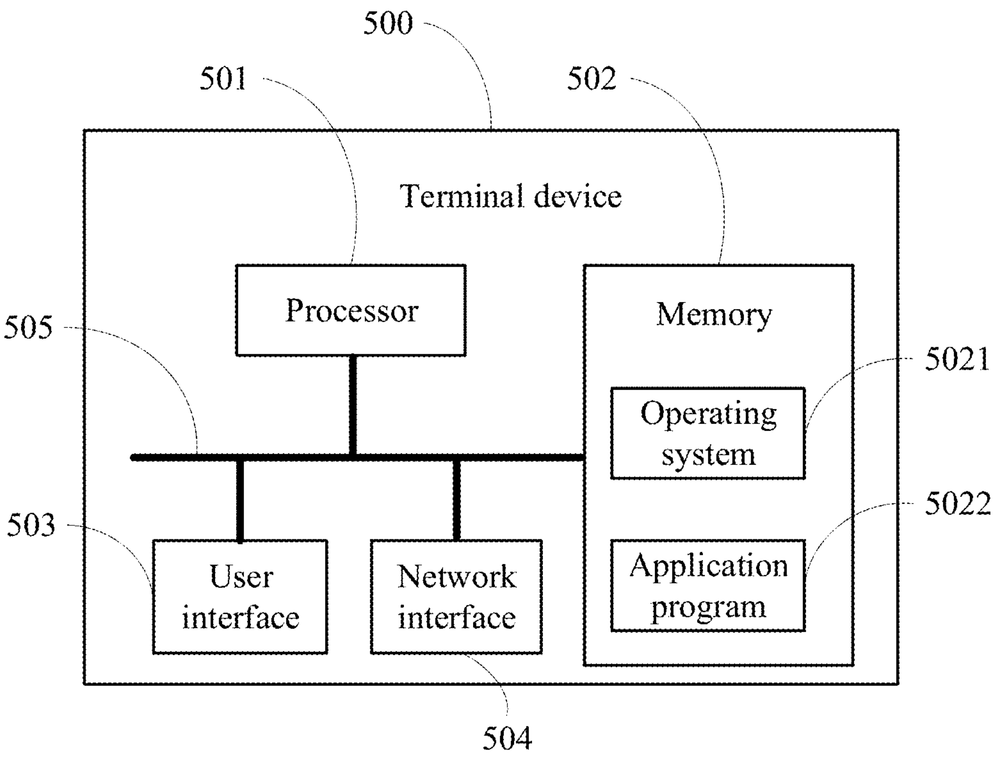
FIG. 5 is a schematic structural diagram of a terminal device according to another embodiment of this application.

FIG. 5 is a block diagram of a terminal device according to another embodiment of this application. As shown in FIG. 5, a terminal device 500 includes: at least one processor 501, a memory 502, at least one network interface 504, and a user interface 503. All components in the terminal device 500 are coupled together through a bus system 505. It can be understood that the bus system 505 is configured to implement connection and communication between these components. In addition to a data bus, the bus system 505 further includes a power bus, a control bus, and a status signal bus. However, for clear description, various buses are marked as the bus system 505 in FIG. 5.

The user interface 503 may include a display, a keyboard, a clicking device (for example: a mouse and a trackball), a touch panel, or a touchscreen.

It can be understood that the memory 502 in this embodiment of this application may be a volatile memory or a nonvolatile memory, or may include both a volatile memory and a nonvolatile memory. The nonvolatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 502 in the system and the method that are described in the embodiments of this application is intended to include but is not limited to these memories and a memory of any other proper type.

In some implementation manners, the memory 502 stores the following element, an executable module or a data structure, or a subset thereof, or an extension set thereof: an operating system 5021 and an application program 5022.

The operating system 5021 includes various system programs, for example, a framework layer, a kernel library layer, and a driver layer, and is configured to implement various basic services and process hardware-based tasks. The application program 5022 includes various application programs, for example, a media player and a browser, and is configured to implement various application services. A program for implementing the method according to this embodiment of this application may be included in the application program 5022.

In this embodiment of this application, the terminal device 500 further includes a computer program that is stored in the memory 502 and that can be run on the processor 501, and when the computer program is executed by the processor 501, the steps of the following method embodiment 100 are implemented.

The method disclosed the foregoing embodiments of this application may be applied to the processor 501, or may be implemented by the processor 501. The processor 501 may be an integrated circuit chip having a signal processing capability. During implementation, each step of the foregoing method may be completed by using an integrated logic circuit of hardware in the processor 501 or an instruction in a form of software. The processor 501 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 502, and the processor 501 reads information from the memory 502 and completes the steps of the foregoing method in combination with its hardware. The computer-readable storage medium stores a computer program, and when the computer program is executed by the processor 501, the steps of the foregoing method embodiment 100 are performed.

It can be understood that the embodiments described in the embodiments of this application may be implemented by hardware, software, firmware, middleware, microcode, or a combination thereof. For implementation with hardware, the processing unit can be implemented in one or more Application Specific Integrated Circuits (ASIC), a Digital Signal Processing (DSP), a DSP Device (DSPD), a Programmable Logic Device (PLD), a Field-Programmable Gate Arrays (FPGA), general processors, controllers, microcontrollers, microprocessors, and another electronic unit for implementing the functions of this application, or their combinations.

For implementation with software, the technologies in the embodiments of this application may be implemented through modules (for example, procedures or functions) that perform the functions in the embodiments of this application. A software code may be stored in the memory and executed by the processor. The memory may be implemented in the processor or outside the processor.

The terminal device 500 can implement each process implemented by the terminal device in the foregoing embodiments, and the same or equivalent technical effect can be achieved. To avoid repetition, details are not described herein again.

Figure 6:
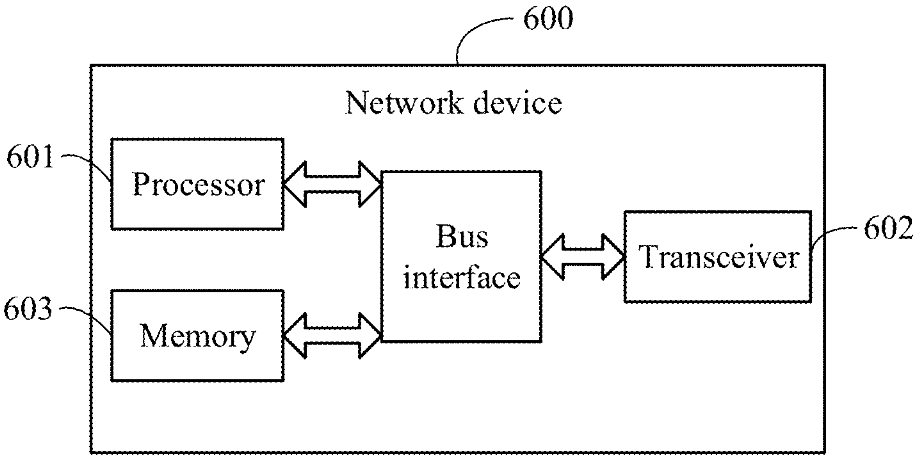
FIG. 6 is a schematic structural diagram of a network device according to another embodiment of this application.

Referring to FIG. 6, FIG. 6 is a structural diagram of a network device to which an embodiment of this application is applied, so that details of a method embodiment 200 can be implemented, and a same effect can be achieved. As shown in FIG. 6, a network device 600 includes a processor 601, a transceiver 602, a memory 603, and a bus interface. In this embodiment of this application, the network device 600 further includes a computer program that is stored in the memory 603 and that can be run on the processor 601. When the computer program is executed by the processor 601, the steps of this method embodiment 200 are implemented.

In FIG. 6, a bus architecture may include any quantity of interconnected buses and bridges, which are connected together by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface provides interfaces. The transceiver 602 may be a plurality of elements, in other words, includes a transmitter and a receiver, and provides a unit configured to communicate with various other apparatuses on a transmission medium.

The processor 601 is responsible for managing the bus architecture and common processing, and the memory 603 may store data used when the processor 601 performs an operation.

An embodiment of this application further provides a computer-readable storage medium. The computer-readable storage medium stores a computer program, and when a processor executes the computer program, the processes of the embodiments of the foregoing method embodiment 100 and method embodiment 200 are implemented and the same technical effect can be achieved. To avoid repetition, details are not described herein again. The computer readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementation manners, a person skilled in the art may clearly understand that the foregoing method embodiments may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for associating a neighboring cell, performed by a terminal device, comprising:

receiving first configuration information, wherein the first configuration information is configuration of one or more control resource sets (CORESETs), wherein a first CORESET of the one or more CORESETs is associated with the neighboring cell of the terminal device, wherein the first configuration information of the first CORESET comprises Transmission Configuration Indication (TCI) information of the first CORESET, wherein the TCI information comprises a first Reference Signal (RS) and identification of a target network node, wherein the first RS is the RS of the neighboring cell, and the target network node comprises the neighboring cell.

2. The method according to claim 1, wherein the first configuration information comprises at least one of the following of the terminal device or configuration information associated with at least one of the following:

cell-configuration related information;

cell group configuration information;

special cell configuration information;

serving cell configuration information;

serving cell common configuration information;

physical downlink control channel (PDCCH) configuration information;

physical uplink control channel (PUCCH) configuration information;

downlink common configuration information;

uplink common configuration information;

downlink bandwidth part (BWP);
downlink common BWP; or
downlink dedicated BWP.

3. The method according to claim 1, wherein the first CORESET comprises at least one of the following:

CORESET #0; a CORESET with the smallest number; a CORESET with the largest number; a CORESET agreed in a protocol; a CORESET configured by a network device; or a CORESET reported by the terminal device.

4. The method according to claim 1, wherein the first configuration information of the first CORESET indicates at least one of the following:

an identifier of the target network node; or
information about an identifier of the target network node.

5. The method according to claim 4, wherein the information about an identifier comprises scrambling information used to scramble a signal or channel.

6. The method according to claim 4, wherein the first configuration information of the first CORESET further comprises at least one of the following or configuration information associated with at least one of the following:

physical downlink control channel (PDCCH) configuration information; or
control resource set (ControlResourceSet) information.

7. The method according to claim 1, wherein related configuration information of a channel or signal associated with the first configuration information is updated.

8. The method according to claim 7, wherein the channel or signal associated with the first configuration information comprises at least one of the following: a physical downlink control channel (PDCCH), a physical downlink shared channel (PDSCH), a physical uplink control channel (PUCCH), a physical uplink shared channel (PUSCH), a sounding reference signal (SRS), a channel state information reference signal (CSI-RS), a synchronization and system information block (SSB), or a physical random access channel (PRACH).

9. The method according to claim 8, wherein the channel or signal associated with the first configuration information comprises the PDCCH, the PDCCH is indicated by a second CORESET, and the second CORESET comprises at least one of the following:

a CORESET except for the first CORESET of a plurality of CORESETs;
a CORESET except for the first CORESET of a plurality of CORESETs corresponding to a first Transmission and Reception Point (TRP) identifier, wherein the first TRP identifier comprises a TRP identifier corresponding to the first CORESET;
a CORESET except for the first CORESET of CORESETs of the terminal device; or
a CORESET except for the first CORESET in a CORESET list configured by a network device.

10. The method according to claim 8, wherein the channel or signal associated with the first configuration information comprises a first channel or a first signal and a second channel or a second signal, wherein the first channel or the first signal is directly associated with the first configuration information, and the second channel or the second signal is associated with the first channel or the first signal.

11. The method according to claim 7, wherein update of the related configuration information of the channel or signal associated with the first configuration information comprises at least one of the following:

first TCI follows the first CORESET;
first QCL follows the first CORESET;
first spatial relation information follows the first CORESET;
first TCI is associated with a first RS of the neighboring cell;
first QCL is associated with a first RS of the neighboring cell;
first spatial relation information is associated with a first RS of the neighboring cell;
a second TRP identifier follows the first CORESET;
first scrambling information follows the first CORESET;
a first radio network temporary identifier RNTI follows the first CORESET;
a first path loss reference reference signal (RS) follows a second RS in TCI or QCL of the first CORESET; or
a first path loss reference RS follows a first RS of the neighboring cell,
wherein the first TCI, the first QCL, the first spatial relation information, the second TRP identifier, the first scrambling information, the first RNTI, and the first path loss reference RS belong to the channel or signal associated with the first configuration information.

12. The method according to claim 11, wherein an RS in the first TCI, an RS in the first QCL, an RS in the first spatial relation information, and the first path loss reference RS are the first RS of the neighboring cell indicated by at least one of the following:

radio resource management (RRM); radio link management (RLM); beam reporting; or beam management.

13. The method according to claim 12, wherein the first RS is at least one of the following:

system information block (SSB); channel state information reference signal (CSI-RS); or sounding reference signal (SRS).

14. The method according to claim 1, wherein related configuration information of a channel or signal associated with the first configuration information is unchanged.

15. A method for associating a neighboring cell, performed by a network device, comprising:

sending first configuration information, wherein the first configuration information is configuration of one or more control resource sets (CORESETs), and a first CORESET of the one or more CORESETs is associated with a neighboring cell of a terminal device,
wherein the first configuration information of the first CORESET comprises Transmission Configuration Indication (TCI) information of the first CORESET, wherein the TCI information comprises a first Reference Signal (RS) and identification of a target network node, wherein the first RS is the RS of the neighboring cell, and the target network node comprises the neighboring cell.

16. The method according to claim 15, wherein the first configuration information of the first CORESET indicates at least one of the following:

an identifier of the target network node; or
information about an identifier of the target network node.

17. The method according to claim 15, wherein related configuration information of a channel or signal associated with the first configuration information is updated.

18. The method according to claim 17, wherein update of the related configuration information of the channel or signal associated with the first configuration information comprises at least one of the following:

first transmission configuration indication (TCI) follows the first CORESET;
first quasi-co-location (QCL) follows the first CORESET;

first spatial relation information follows the first CORESET;

first TCI is associated with a first reference signal (RS) of the neighboring cell;

first QCL is associated with a first RS of the neighboring cell;

first spatial relation information is associated with a first RS of the neighboring cell;

a second Transmission and Reception Point (TRP) identifier follows the first CORESET;

first scrambling information follows the first CORESET;

a first radio network temporary identifier (RNTI) follows the first CORESET;

a first path loss reference reference signal (RS) follows a second RS in the TCI or QCL of the first CORESET; or a first path loss reference RS follows a first RS of the neighboring cell, wherein the first TCI, the first QCL, the first spatial relation information, the second TRP identifier, the first scrambling information, the first RNTI, and the first path loss reference RS belong to the channel or signal associated with the first configuration information.

19. A terminal device, comprising: a memory storing a computer program; and a processor coupled to the memory and configured to execute the computer program to perform a method for associating a neighboring cell, the method comprising:

receiving first configuration information, wherein the first configuration information is configuration of one or more control resource sets (CORESETs), wherein a first CORESET of the one or more CORESETs is associated with a neighboring cell of the terminal device, wherein the first configuration information of the first CORESET comprises Transmission Configuration Indication (TCI) information of the first CORESET, wherein the TCI information comprises a first Reference Signal (RS) and identification of a target network node, wherein the first RS is the RS of the neighboring cell, and the target network node comprises the neighboring cell.

* * * * *